(12) United States Patent
Cleary et al.

(10) Patent No.: US 12,109,781 B2
(45) Date of Patent: *Oct. 8, 2024

(54) LAMINATE HAVING ORGANIC INK DECORATION AND HIGH IMPACT RESISTANCE

(71) Applicant: Corning Incorporated, Corning, NY (US)

(72) Inventors: Thomas Michael Cleary, Elmira, NY (US); Mark Stephen Friske, Campbell, NY (US); Timothy Scott Huten, Big Flats, NY (US)

(73) Assignee: CORNING INCORPORATED, Corning, NY (US)

( * ) Notice: Subject to any disclaimer, the term of this patent is extended or adjusted under 35 U.S.C. 154(b) by 54 days.

This patent is subject to a terminal disclaimer.

(21) Appl. No.: 17/678,399

(22) Filed: Feb. 23, 2022

(65) Prior Publication Data

US 2022/0176679 A1 Jun. 9, 2022

Related U.S. Application Data

(63) Continuation of application No. 16/613,010, filed as application No. PCT/US2018/032625 on May 15, 2018, now Pat. No. 11,260,629.

(Continued)

(51) Int. Cl.
*B32B 15/04* (2006.01)
*B32B 17/06* (2006.01)
*B32B 17/10* (2006.01)

(52) U.S. Cl.
CPC .. *B32B 17/10266* (2013.01); *B32B 17/10036* (2013.01); *B32B 17/10137* (2013.01);
(Continued)

(58) Field of Classification Search
CPC ................................................. B32B 17/10036
(Continued)

(56) References Cited

U.S. PATENT DOCUMENTS 5,324,373 A 6/1994 Gillner et al.
5,914,178 A 6/1999 Sol et al.
(Continued)

FOREIGN PATENT DOCUMENTS

CN 1671560 A 9/2005
EP 2722318 A1 4/2014
(Continued)

OTHER PUBLICATIONS

Japanese Patent Application No. 2019-563625, Office Action dated Oct. 14, 2022, 2 pages (English Translation only), Japanese Patent Office.

(Continued)

*Primary Examiner* — Lauren R Colgan
(74) *Attorney, Agent, or Firm* — William M. Johnson; Payal A. Patel; Kevin M. Able (57) ABSTRACT

A decorated laminate including: an outer ply; an inner ply; a polymer interlayer between the inner ply and the outer ply; and organic ink printed decoration on one or both of internal surfaces of the laminate between the outer ply and the polymer interlayer or between the inner ply and polymer interlayer, wherein the decorated laminate has a stone impact resistance as defined herein. Also disclosed is a method of making and using the decorated laminate.

16 Claims, 6 Drawing Sheets

Related U.S. Application Data (60) Provisional application No. 62/506,018, filed on May 15, 2017.

(52) U.S. Cl.
CPC .. *B32B 17/10761* (2013.01); *B32B 17/10871* (2013.01); *B32B 2307/558* (2013.01); *B32B 2605/006* (2013.01)

(58) Field of Classification Search
USPC .................................................. 428/426, 428
See application file for complete search history.

(56) References Cited

U.S. PATENT DOCUMENTS

| | | | |
|---|---|---|---|
| 6,495,261 B1* | 12/2002 | Gagliardi | B32B 17/10018 296/84.1 |
| 7,278,730 B2 | 10/2007 | Elwakil | |
| 7,625,627 B2* | 12/2009 | Smith | B32B 17/10247 428/206 |
| 7,955,470 B2* | 6/2011 | Kapp | B32B 17/10697 156/99 |
| 8,002,938 B2 | 8/2011 | Elwakil et al. | |
| 8,287,958 B2 | 10/2012 | Lyon et al. | |
| 9,044,919 B2 | 6/2015 | Offermann et al. | |
| 9,278,884 B2 | 3/2016 | Chen et al. | |
| 9,919,496 B2 | 3/2018 | Michetti et al. | |
| 11,370,199 B2* | 6/2022 | Compoint | B32B 17/10036 |
| 2003/0084640 A1 | 5/2003 | Mason | |
| 2003/0203167 A1 | 10/2003 | Bell et al. | |
| 2004/0234735 A1* | 11/2004 | Reynolds | B32B 17/1077 156/100 |
| 2005/0285920 A1 | 12/2005 | Smith et al. | |
| 2006/0154085 A1* | 7/2006 | Cleary | B32B 17/10761 428/428 |
| 2006/0191625 A1* | 8/2006 | Kapp | B32B 17/10779 427/407.1 |
| 2007/0172637 A1 | 7/2007 | Hayes et al. | |
| 2010/0098917 A1* | 4/2010 | Lyon | B41M 5/0082 427/164 |
| 2011/0096555 A1* | 4/2011 | Pires | B32B 17/10036 428/203 |
| 2012/0025559 A1* | 2/2012 | Offermann | B32B 17/10761 296/84.1 |
| 2012/0328843 A1* | 12/2012 | Cleary | C03C 3/095 428/213 |
| 2013/0186141 A1 | 7/2013 | Henry | |
| 2013/0295357 A1* | 11/2013 | Cleary | B32B 17/10761 428/215 |
| 2013/0295358 A1 | 11/2013 | Paulus et al. | |
| 2014/0093702 A1* | 4/2014 | Kitajima | B32B 17/10889 65/24 |
| 2015/0251377 A1* | 9/2015 | Cleary | B32B 17/10036 428/172 |
| 2016/0075111 A1* | 3/2016 | Dixon | B32B 37/12 428/192 |
| 2016/0243796 A1* | 8/2016 | Mannheim Astete | B32B 17/10651 |
| 2016/0303831 A1 | 10/2016 | Cloots et al. | |
| 2017/0021567 A1 | 1/2017 | Costabeber | |
| 2017/0021597 A1 | 1/2017 | Michetti et al. | |
| 2017/0165944 A1 | 6/2017 | Nania et al. | |
| 2018/0154615 A1* | 6/2018 | Dohn | B32B 17/10266 |
| 2018/0207911 A1* | 7/2018 | Lampman | B32B 17/10834 |
| 2018/0345644 A1 | 12/2018 | Kang et al. | |
| 2019/0150229 A1 | 5/2019 | Lau et al. | |
| 2019/0315113 A1 | 10/2019 | Park et al. | |
| 2020/0290318 A1* | 9/2020 | Mannheim Astete | B32B 17/1077 |

FOREIGN PATENT DOCUMENTS

| | | |
|---|---|---|
| JP | 08-500304 A | 1/1996 |
| JP | 2004-002055 A | 1/2004 |
| JP | 2005-523866 A | 8/2005 |
| JP | 2010-138008 A | 6/2010 |
| JP | 2011-190133 A | 9/2011 |
| JP | 6079639 B2 | 2/2017 |
| JP | 2017-512175 A | 5/2017 |
| WO | 2013/181505 A1 | 12/2013 |
| WO | 2015/092385 A1 | 6/2015 |
| WO | 2016/196546 A1 | 12/2016 |
| WO | 2017/106081 A1 | 6/2017 |

OTHER PUBLICATIONS

"U.S. Appl. No. 14/559,345, filed Dec. 3, 2014, entitled Non-Yellowing Glass Laminate Structure."

Barry, C., "Unexpected Breakage in Ceramic Enameled (FRIT) HS IG Spandrels."; Insulating Glass Manufacturer's Alliance Winter Conference; 11 Pages; Feb. 2015.

Barry, C., "Why Glass Sometimes Breaks." NSG Group; PV Module Reliability Workshop; 49 Pages; Feb. 19, 2010.

Eliasova, M., "Advanced Design of Glass Structures." Lecture L5_ME Glued Connection; Czech Technical University in Prague; 60 Pages; 2011.

International Search Report and Writien Opinion of the International Searching Authority in Corresponding PCT Application No. PCT/US2018/032625; Mailed Aug. 29, 2018; 13 Pages; European Patent Office.

Sakoske, G. et al., "Pressure Forming of Automotive Glass and Challenges for Glass-Ceramic Enamels." Glass Processing Days: 6th International Conference on Architectural and Automotive Glass; vol. 34; 10 Pages; Jun. 1999.

U.S. Appl. No. 62/268,111, filed Dec. 16, 2015.

U.S. Appl. No. 62/269,356, filed Dec. 18, 2015.

U.S. Appl. No. 62/343,937, filed Jun. 1, 2016, entitled "Asymmetric Glass Laminates,".

National Highway Traffic Safety Administration, 49 CFR Part 571, "Federal Motor Vehicle Safety Standards; Glazing Materials; Low Speed Vehicles," Federal Registrar, vol. 68, No. 143, dated Jul. 25, 2003.

European Committee for Standardization, Ref. No. EN 14449:2005, ":Glass in building—Laminated glass and laminated safety glass—Evaluation of conformity/Product standard," May 2005.

Regulation No. 43 of the Economic Commission for Europe of the United Nations (UN/ECE)—"Uniform provisions concerning the approval of safety glazing materials and their installation on vehicles," Apr. 3, 2017.

\* cited by examiner

LAMINATE HAVING ORGANIC INK DECORATION AND HIGH IMPACT RESISTANCE

CROSS-REFERENCE TO RELATED APPLICATIONS

This application is a continuation of U.S. patent application Ser. No. 16/613,010, filed Nov. 12, 2019, which is a national stage application under 35 U.S.C. § 371 of International Application No. PCT/US2018/032625, filed on May 15, 2018, which claims the benefit of priority under 35 U.S.C. § 119 of U.S. Provisional Application Ser. No. 62/506,018, filed on May 15, 2017, the content of each of which is relied upon and incorporated herein by reference in its entirety.

The disclosure relates to commonly owned and assigned application(s) or patent(s): U.S. Provisional Application Ser. No. 62/268,111, filed Dec. 16, 2015; 62/269,356, filed Dec. 18, 2015; and 62/343,937, filed Jun. 1, 2016, entitled "ASYMMETRIC GLASS LAMINATES," which mention highly asymmetric laminates having high stone impact resistance, but does not claim priority thereto.

The disclosure also relates to commonly owned and assigned application(s) or patent(s): U.S. application Ser. No. 13/247,182, filed Sep. 28, 2011, entitled "LIGHTWEIGHT HYBRID GLASS LAMINATES,"; and Ser. No. 14/559,345, filed Dec. 3, 2014, entitled "NON-YELLOWING GLASS LAMINATE STRUCTURE.

The entire disclosure of each publication or patent document mentioned herein is incorporated by reference.

BACKGROUND

The disclosure relates to laminates having organic ink decoration.

SUMMARY

In embodiments, the disclosure provides, for example:
a laminate having an organic ink decoration;
a laminate glass structure having, for example, a combination of hardness, resilience, lightweight, high mechanical strength, resistance to damage from impinging objects, and sound attenuating properties;
a laminate having superior stone impact resistance; and
a method for making the laminates.

BRIEF DESCRIPTION OF THE DRAWINGS

In embodiments of the disclosure.

DETAILED DESCRIPTION

Various embodiments of the disclosure will be described in detail with reference to drawings, if any. Reference to various embodiments does not limit the scope of the invention, which is limited only by the scope of the claims attached hereto. Additionally, any examples set forth in this specification are not limiting and merely set forth some of the many possible embodiments of the claimed invention.

Definitions

"Include," "includes," or like terms means encompassing but not limited to, that is, inclusive and not exclusive.

"About" modifying, for example, the quantity of an ingredient in a composition, concentrations, volumes, process temperature, process time, yields, flow rates, pressures, viscosities, and like values, and ranges thereof, or a dimension of a component, and like values, and ranges thereof, employed in describing the embodiments of the disclosure, refers to variation in the numerical quantity that can occur, for example: through typical measuring and handling procedures used for preparing materials, compositions, composites, concentrates, component parts, articles of manufacture, or use formulations; through inadvertent error in these procedures; through differences in the manufacture, source, or purity of starting materials or ingredients used to carry out the methods; and like considerations. The term "about" also encompasses amounts that differ due to aging of a composition or formulation with a particular initial concentration or mixture, and amounts that differ due to mixing or processing a composition or formulation with a particular initial concentration or mixture.

"Optional" or "optionally" means that the subsequently described event or circumstance can or cannot occur, and that the description includes instances where the event or circumstance occurs and instances where it does not.

The indefinite article "a" or "an" and its corresponding definite article "the" as used herein means at least one, or one or more, unless specified otherwise.

Abbreviations, which are well known to one of ordinary skill in the art, may be used (e.g., "h" or "hrs" for hour or hours, "g" or "gm" for gram(s), "mL" for milliliters, and "rt" for room temperature, "nm" for nanometers, and like abbreviations).

Specific and preferred values disclosed for components, ingredients, additives, dimensions, conditions, times, and like aspects, and ranges thereof, are for illustration only; they do not exclude other defined values or other values within defined ranges. The composition and methods of the disclosure can include any value or any combination of the values, specific values, more specific values, and preferred values described herein, including explicit or implicit intermediate values and ranges.

WO 2015092385 mentions a laminated glazing comprising a first ply of glazing material and a second ply of glazing material joined by at least one ply of adhesive interlayer material is disclosed. The first ply of glazing material comprises a sheet of glass having a first composition and the second ply of glazing material comprises a sheet of glass having a second composition different to the first composition. The laminated glazing has (i) a peripheral region extending around the periphery of the laminated glazing, the laminated glazing having a surface compression stress in the peripheral region and (ii) an edge compression, wherein the magnitude of edge compression is greater than the magnitude of the surface compression stress in the peripheral region. A method of making such a laminated is provided. A glass sheet suitable for being incorporated in such a laminated glazing is also disclosed.

U.S. Pat. No. 7,955,470, mentions methods of decorating laminated glass with organic inks.

WO2013181505 mentions the use of an inner ply of chemically strengthened glass and an outer ply of soda lime-silicate glass. Flaws are formed in the ply of chemically strengthened glass to provide the laminate with a specific impact breakage performance.

U.S. 20130295357 mentions the use of a chemically toughened outer glass ply and a non-chemically toughened inner glass ply joined by a polymer interlayer to produce a laminated glazing. U.S. 20130295357 also mentions the use of a non-chemically strengthened external glass sheet, a chemically strengthened inner glass sheet, and at least one polymer interlayer intermediate the external and internal glass sheets.

Laminates comprising opposing glass substrates (which can be sheets) separated by a plasticized polyvinyl butyral (PVB) sheet, for example, can be used as windows, automotive glazings such as windshields or sunroofs. In certain applications, glass laminates having high mechanical strength, resistance to damage from impinging objects, and sound attenuating properties are desirable to provide a safe barrier while reducing the potential of at least one substrate forming the laminate fracturing due to surface cracks. In many cases, laminates are made with decorative glass/ceramic enamel frit fused onto surfaces 2, 3, 4, or combinations thereof. This decorative glass/ceramic enamel frit is applied to areas, usually adjacent to the perimeter of the laminate, where it is required for functional purposes, such as acting as a UV-blocking layer to prevent UV light degradation of adhesive materials used to attach a laminate to its frame or structure, and for cosmetic purposes, such as obscuring from view the framing and adhesives required to secure the glass laminate in position. The presence of glass/ceramic enamel frit on S2 has recently been found to have led to the fracture of laminate roof panels due to flexure of this surface likely caused by impact to S1 of the laminate.

During use, it is desirable that the glass laminates resist fracture in response to external impact events. Fracture due to flexure of decorative glass/ceramic enamel frit on S2, S4, or both, has been identified as a failure mechanism for real world automotive laminate parts. Light weight laminates are desired to reduce weight in automobiles. A main cause of glass laminate replacements in the field is due to stone impact. Stone impact can cause fracture of the laminates by several mechanisms including blunt (Hertzian) contact, sharp contact, and flexure. Blunt (Hertzian) contact creates a ring/cone crack which initiates from an existing flaw on the #1 (exterior) surface of the laminate and then propagates through the thickness of the exterior ply. Sharp contact creates damage that propagates through the thickness of the outer ply and then creates radial/median cracks. Flexure of the laminate activates flaws on surface #2 (surface of the outer ply adjacent the interlayer) and/or surface #4 (interior surface of the inner ply). Decorative glass/ceramic enamel frit has been found to locally, and significantly degrade the strength of the surface or glass ply to which frit is adhered. To improve the impact resistance, especially for a thin laminate, it is be desirable to address the failure mode of the low impact resistance due to the decorative glass/ceramic enamel frit, particularly as laminates are made thinner, as flexure becomes more critical as the greater deflection during impact will result in higher and larger stress fields on surfaces #2 and #4.

In embodiments, the disclosure provides a decorated laminate comprising:
an un-strengthened outer ply glass substrate;
an chemically strengthened inner ply glass substrate;
a polymer interlayer between the inner ply and the outer ply; and
organic ink printed decoration on one or both of internal surfaces of the laminate between the un-strengthened glass and polymer interlayer, between the strengthened glass and polymer interlayer, or between both, i.e., S2, S3, or both, i.e., other than the external surfaces such as the exterior or interior of the laminate with respect to outside the vehicle and inside the vehicle.

In embodiments, the disclosure provides a decorated laminate comprising:
an outer ply comprising an un-strengthened glass substrate having a thickness, for example, of from 1.5 to 3 mm, of from 1.5 to 2.8 mm, of from 1.5 to 2.6 mm, of from 1.5 to 2.5 mm, of from 1.5 to 2.2 mm, of from 1.5 to 2 mm, including intermediate values and ranges;
an inner ply comprising a chemically strengthened glass substrate having an thickness of from 0.05 to 0.7 mm;
a polymer interlayer between the inner ply and the outer ply; and
organic ink printed decoration on one or both of internal surfaces of the laminate between the un-strengthened glass and polymer interlayer or between the strengthened glass and polymer interlayer, i.e., S2, S3, or both, i.e., other than the external surfaces such as the exterior of the laminate.

In embodiments, the decorated laminate has a simulated stone impact resistance as measured by break velocity, for example, of from 40 to 95% at from 75 to 85 mile per hour.

In embodiments, the organic ink printed decoration can have a thickness of from 5 to 25 microns, of from 5 to 20 microns, of from 5 to 15 microns, of from 5 to 12 microns, of from 6 to 12 microns, of from 7 to 10 microns, including intermediate values and ranges. A thickness of typical organic ink printed decoration, after for example, printing, drying and curing, can be, for example, of from 8 to 10 microns. Curing can be accomplished by any suitable means such as using heat (i.e., thermally), irradiation (e.g., UV light), and like methods, or a combination thereof.

In embodiments, the un-strengthened glass substrate can be, for example, standard soda lime, the polymer interlayer can be, for example, polyvinyl butyral, the chemically strengthened glass substrate can be, for example, ion-exchanged glass, and the organic ink printed decoration can be, for example, a curable ink.

In embodiments, the polymer interlayer can have a thickness, for example, of from 0.125 mm to 3.0 mm.

In embodiments, the polymer interlayer can have a thickness, for example, of from 0.25 mm to 1.6 mm.

In embodiments, the polymer interlayer can be, selected from the group consisting of, for example, polyvinyl butyral, ethylenevinylacetate, polyvinyl chloride, ionomers, thermoplastic polyurethane, and like polymers, or combinations thereof.

In embodiments, the decorated laminate can further comprise, for example, a vehicle having at least one decorated laminate.

In embodiments, the outer ply can have, for example, a thickness ($t_o$) and the inner ply comprising a strengthened glass can have, for example, a thickness ($t_i$), and a ratio of $t_o:t_i$ of from 1 and 20, of from 3 and 20, of from 3 and 15, of from 4 and 10, and like ratios, including intermediate values and ranges.

In embodiments, the disclosure provides a method of making the above mentioned laminate, comprising:
  combining, in order, the outer ply, the interlayer, and the inner ply in a stack; and applying heat and pressure to the stack to form the laminate.

In embodiments, at least one interior surface (e.g., S2, S3, or both S2 and S3) within the stack has organic ink printed decoration thereon prior to combining in a stack.

In embodiments, the present disclosure is advantaged in several aspects, including for example:
  significant improvement in the resistance to fracture of the laminate upon impact of an object, such as a stone, upon Surface 1 (S1) of the laminate. These improved performance properties can provide lower field failures and reduce replacements.

In embodiments, the present disclosures provides a laminate solution, which mitigates the impact failure mode in the enamel region by replacing the decorative glass/ceramic enamel frit, which is typically fused on the glass surfaces #2 (S2), #4 (S2), or both, with an organic ink material which does not cause strength (and therefore impact resistance) degradation. Due to the nature of the organic ink, it can be deposited, for example, on S2, S3, or both. The organic ink can be composed of materials that include, for example: a polymeric system that acts as the continuous matrix of the ink layer, such as acrylic, epoxy, or polyester; organic or inorganic pigments; and fillers, suitable to achieve the desired color and opacity of the ink layer; additives and solvents as necessary to facilitate the process to uniformly apply the organic ink on to the glass surface. The organic ink is preferably a liquid during its application to the glass surface, and is transformed to a solid layer by one or more methods including, for example: curing by exposure to UV light; curing by exposure to heat; curing at ambient conditions with time; evaporation or removal of solvents, or combinations thereof.

In a preferred embodiment, a relatively thick (1.6 to 3 mm thick) outer ply of annealed glass is constructed having an organic ink on S2, an interlayer such as polyvinyl butyral (PVB), and a thin inner ply of strengthened glass (e.g., chemically, thermally, or due to glass laminate strengthening). In embodiments, the organic ink is placed on S2 and S3, or just S3. In embodiments, a strengthened outer ply (e.g., chemically, thermally, or due to glass laminate strengthening) can be selected. In embodiments, additional desirable components can be selected such an infra-red reflective ("IRR") coating on S2 or S3, or an IRR film laminated in between the layers of PVB. In embodiments, an inter-layer having acoustic dampening can be selected. In embodiments, a wedged PVB can be selected for use with a heads up display (HUD) system, with or without an acoustic dampening inter-layer.

In embodiments, the presently disclosed laminates can have an outer ply and an inner ply that can be made of un-strengthened, semi-tempered (heat-strengthened), fully thermally tempered, laminate-strengthened glass or chemically tempered glass, and the plies are laminated together by an adhesive interlayer of, for example, a plasticized polyvinyl butyral (PVB), ethylene-vinyl acetate copolymer (EVA), thermoplastic urethane (TPU), ionomer (SentryGlas®), acrylic, thermoplastic elastomer (TPE), or combinations thereof.

In embodiments, the disclosure provides preferred laminates having a highly asymmetric construction where the laminate includes an outer ply having a thickness ($t_o$) and an inner ply comprising a strengthened glass having a thickness ($t_i$) of from 0.05 mm to 1 mm such that $t_o/t_i$ is of from 3 and 20 with the organic ink decoration deposited on S2, S3, or both.

EXAMPLES

The following Examples demonstrate making, use, and analysis of the disclosed laminates and methods in accordance with the above general procedures.

Example 1

Laminate Fabrication Glass laminates can be adapted to provide an optically transparent barrier in architectural and automotive openings, e.g., automotive glazings. Glass laminates can be formed using a variety of processes (see for example, the abovementioned commonly owned copending application U.S. Ser. No. 14/559,34). The assembly, in an exemplary embodiment, involves laying down a first sheet of glass, overlaying a polymer interlayer such as a PVB sheet, laying down a second sheet of glass, and then trimming the excess PVB to the edges of the glass sheets. Any one or both of these sheets of glass can be strengthened or un-strenghtened glass. A tacking step can include, for example, expelling most of the air from the interfaces and partially bonding the PVB to the glass sheets. The finishing step, typically carried out at elevated temperature and pressure, completes the mating of each of the glass sheets to the polymer interlayer. In the foregoing embodiment, the first sheet can be a chemically-strengthened glass sheet, and the second sheet can be a non-chemically-strengthened glass sheet or vice versa.

A thermoplastic material such as PVB can be applied as a preformed polymer interlayer. The thermoplastic layer can, in certain embodiments, have a thickness of at least 0.125 mm, e.g., 0.125, 0.25, 0.38, 0.5, 0.7, 0.76, 0.81, 1, 1.14, 1.19, or 1.2 mm. The interlayer or thermoplastic layer can have a thickness of less than or equal to 1.6 mm, e.g., from 0.4 to 1.2 mm, such as about 0.4, 0.5, 0.6, 0.7, 0.8, 0.9, 1.0, 1.1, or 1.2 mm. The interlayer or thermoplastic layer can have thicknesses greater than 1.6 mm, e.g., from 1.6 mm to 3.0 mm, from 2.0 mm to 2.54 mm, and like ranges, including intermediate values and ranges. The thermoplastic layer can cover most or, preferably, substantially all of the two opposed major faces of the glass. The thermoplastic layer can also cover the edge faces of the glass. The glass sheets in contact with the thermoplastic layer can be heated above the softening point of the thermoplastic, such as, for example, at least 5° C. or 10° C. above the softening point, to promote bonding of the thermoplastic material to the respective glass sheets. The heating can be performed with the glass in contact with the thermoplastic layers under pressure. One or more polymer interlayers can be incorporated into an exemplary glass laminate structure. A plurality of interlayers can provide, for example, complimentary or distinct functionality, including impact performance, adhesion promotion, acoustic control, UV transmission control, tinting, coloration, IR transmission control, and like functions.

Example 2

Stone Impact Resistance Evaluation

The stone impact resistance of the disclosed and comparative commercial laminates was tested with a 1 g ball bearing (6.35 mm dia.) at a 45 degree angle of incidence. A stair-step method was used starting with a low velocity and increasing the velocity in increments of about 5 mph until fracture was observed. The procedure was repeated for each data point in the Weibull plot of FIG. 5 for a failure rate or failure percentage of the disclosed laminates from 40 to 95% at a break velocity of from 75 to 85 miles per hour.

Figure 1:
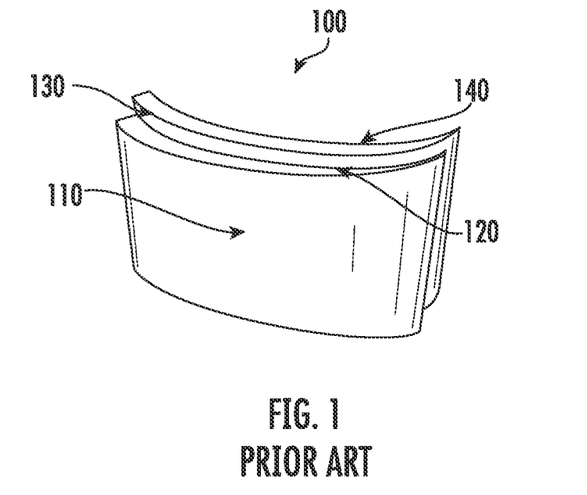
FIG. 1 [PRIOR ART] illustrates the configuration of a commercial laminate (100) such as a windshields, which usually includes two plies of glass and a polymer interlayer. The two plies of glass can be flat or formed to three-dimensional shapes. In this disclosure the side of the laminate facing outside the vehicle when installed was labeled as surface 1 (S1; exterior) (110). The opposite side of the S1 surface, which is bonded onto the interlayer, is labeled the surface 2 (S2; bonded to interlayer) (120). Meanwhile, the side of the laminate facing inside the vehicle when installed is labeled the surface 4 (S4; interior) (140), and its opposite side is labeled the surface 3 (S3; bonded to interlayer) (130).
Figure 2A:
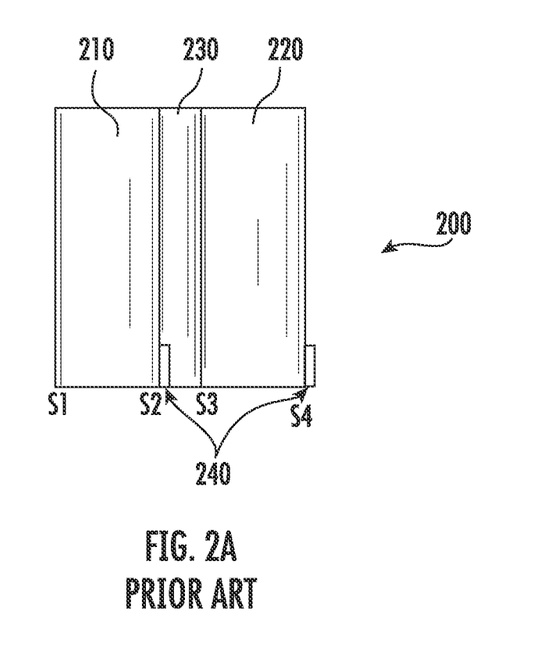
FIG. 2A to 2C [PRIOR ART] show cross-sectional schematics of conventional auto laminates (200) having an outer ply (210), inner ply (220), and a polymer interlayer (230) such as PVB, showing that decorative glass/ceramic enamel frit (240) is located on S2, S4, or both S2 and S4 surfaces.
Figure 2B:
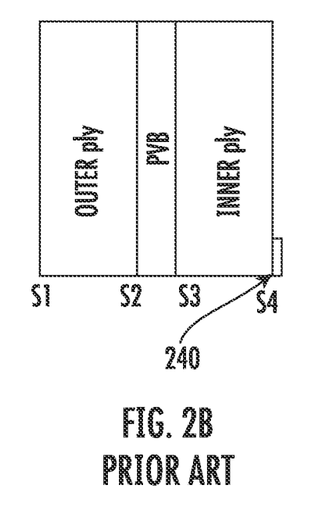
Figure 2C:
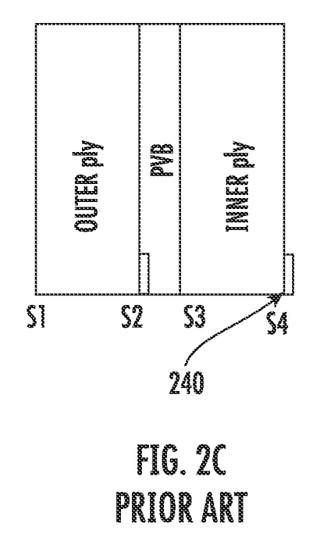
Figure 3:
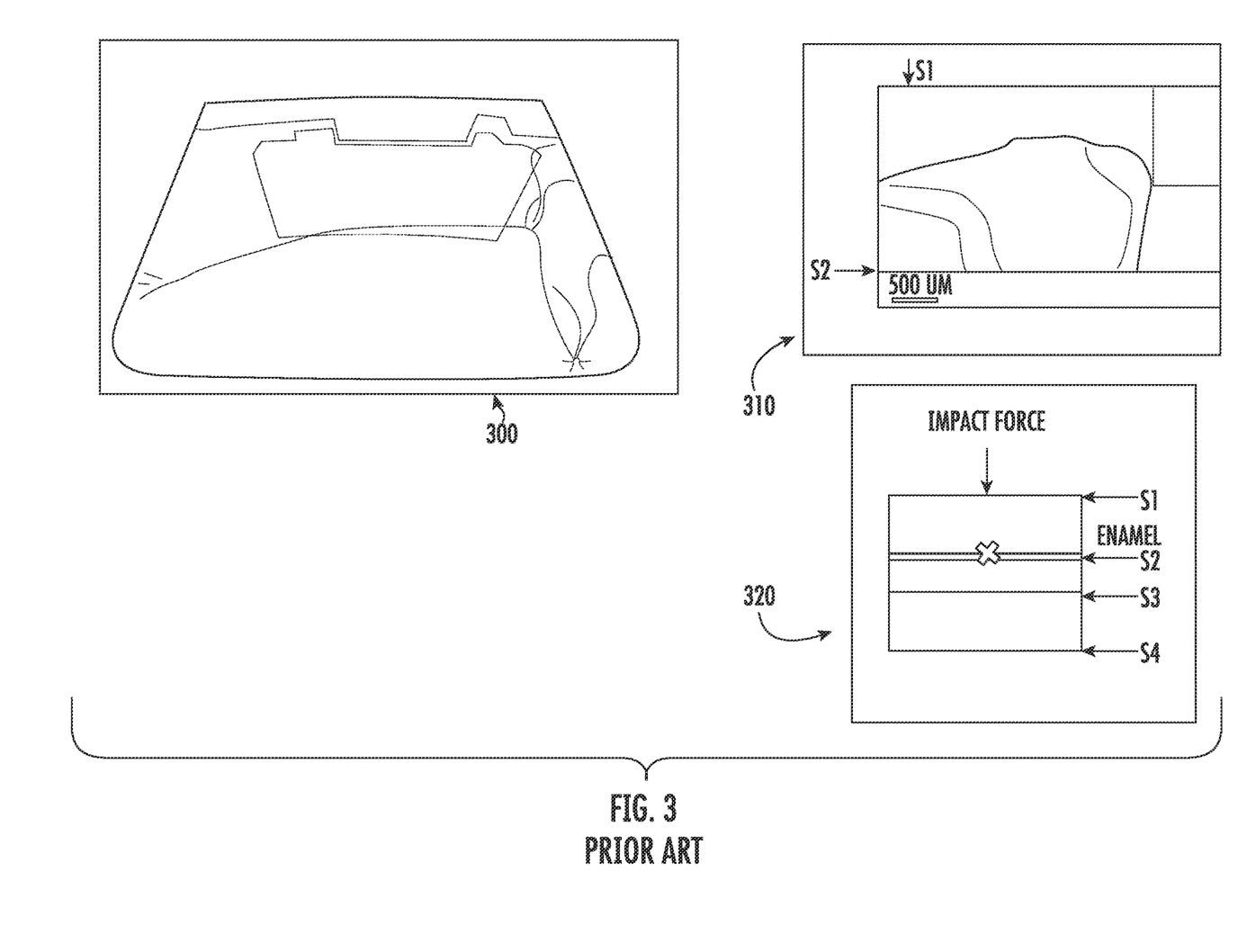
FIG. 3 [PRIOR ART] shows: a roof-glass laminate that failed in the field (300); the cross-section of the fracture (310) detailing that the failure origin occurred near the lead edge (lower portion of the figure) in the glass/ceramic enamel frit present on S2; and a schematic (320) of the failed part where the "X" denotes the location of the fracture origin.
Figure 4:
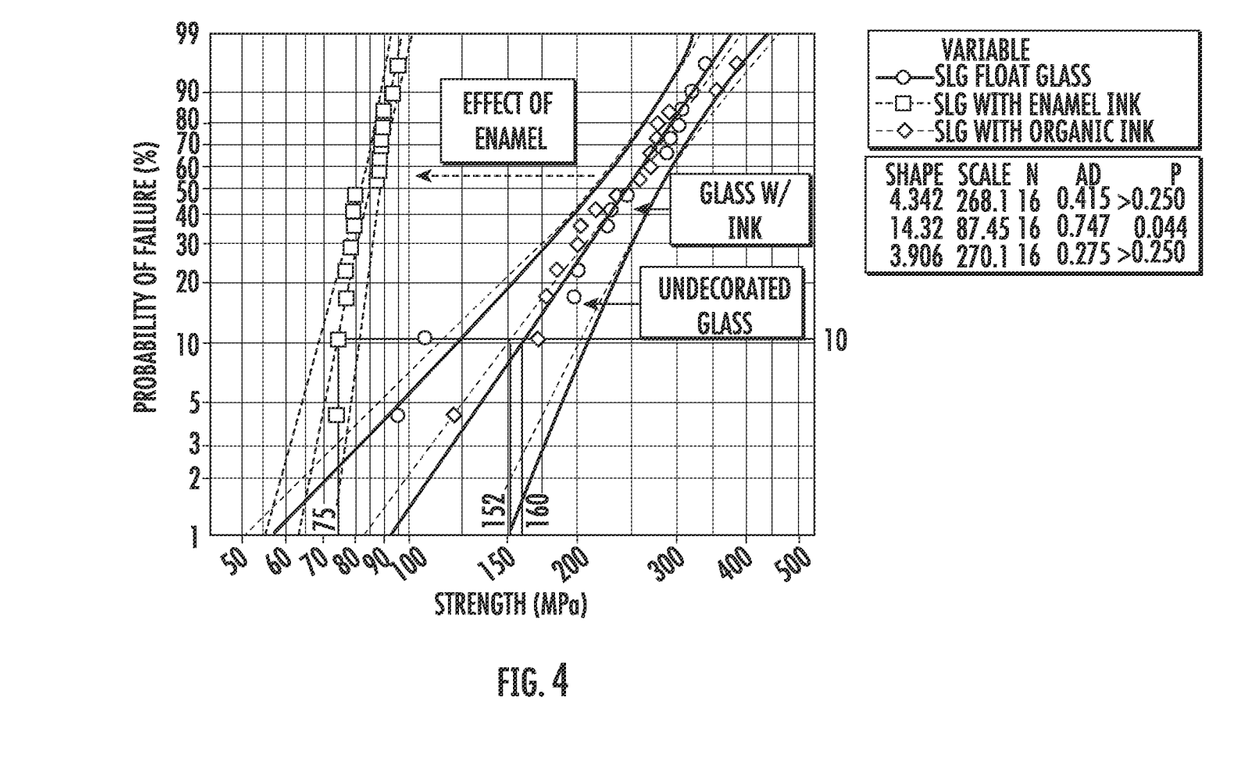
FIG. 4 shows a Weibull plot of strength (measured via ring-on-ring method) for bare float glass, float glass with glass/ceramic enamel frit, and float glass with organic ink. The data shows that glass/ceramic enamel frit degrades strength by greater than 50%; whereas, in constrast, the presence of organic ink has no significant effect on strength of the glass.
Figure 5:
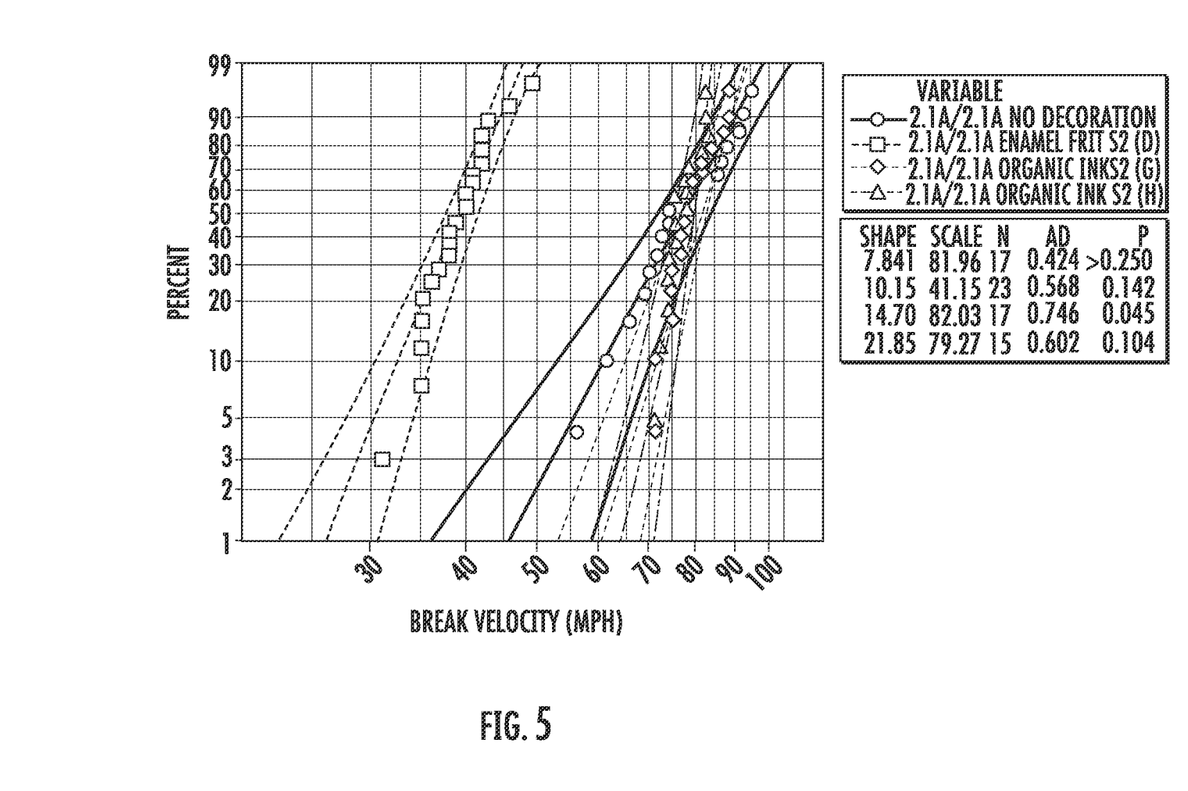
FIG. 5 shows a Weibull plot showing the velocity to induce fracture when a laminated glass panel is impacted with a 1-gram ball bearing at 45 degree angle of incidence. The data shows that laminates made with organic ink on S2 require a much higher velocity to induce fracture compared to laminates made with a conventional construction with conventional glass/ceramic enamel frit on surface 2. It also shows that using organic ink on S2 does not have a negative effect on the impact resistance compared to a laminate with no decoration on S2.
Figure 6:
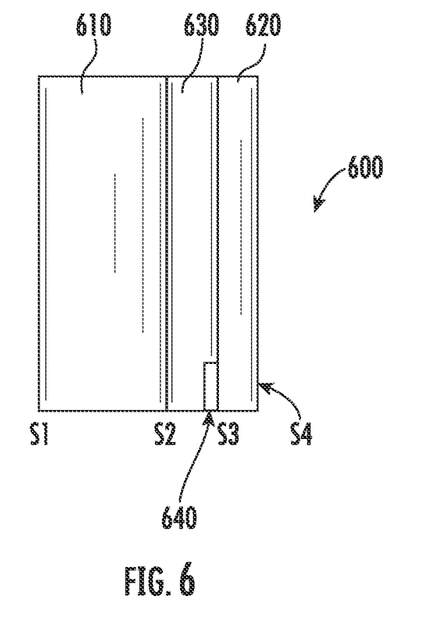
FIG. 6 shows a schematic of an embodiment of the disclosure showing a laminate (600) having an outer ply (610), inner ply (620), and a polymer interlayer (630) such as PVB, with the decorative organic ink (640) placed on S3. In other embodiments the ink (640) can located on surface S2, S3, or S2 and S3. In a preferred embodiment, the laminate is highly asymmetric with, for example, the outer ply at least 2:1 thicker than the inner ply.

FIG. 5 additionally shows that at a break velocity of 50 mph about a 99% failure rate is observed for 2.1A/2.1 A laminate parts having an S2 enamel frit decoration (red squares). In contrast, only about 1% of the 2.1A/2.1A laminate parts having an no decoration (dots) fail, and less than 1% of the 2.1A/2.1 A laminate parts having an S2 organic ink decoration (diamonds), and the 2.1 A/0.7 Gorilla Glass® laminate parts having an S2 organic ink decoration (triangles) fail.

The disclosure has been described with reference to various specific embodiments and techniques. However, it should be understood that many variations and modifications are possible while remaining within the scope of the disclosure.

What is claimed is:

1. An automotive glazing comprising:
    an outer ply comprising an un-strengthened glass substrate having a thickness to;
    an inner ply comprising a chemically strengthened glass substrate having a thickness $t_i$, wherein $t_o$ is at least two times greater than $t_i$;
    a polymer interlayer between the inner ply and the outer ply; and
    an organic ink decoration disposed and cured on the outer ply such that the organic ink decoration comprises a solid ink layer bonded to the outer ply and disposed between the outer ply and the interlayer, wherein the solid ink layer comprises an organic or inorganic pigment,
    wherein the organic ink decoration has a thickness of from 5 microns to 25 microns,
    wherein the automotive glazing has a simulated stone impact resistance as measured by a Weibull distribution of break velocities of from 40% to 95% when struck by a 1-gram ball bearing at a 45-degree angle of incidence at from 75 to 85 miles per hour.

2. The automotive glazing of claim 1, wherein the organic ink decoration is disposed and cured on both the outer ply and the inner ply adjacent the polymer interlayer.

3. The automotive glazing of claim 1, wherein the outer ply comprises soda lime glass the polymer interlayer comprises polyvinyl butyral, the inner ply is ion-exchanged glass.

4. The automotive glazing of claim 1, wherein the polymer interlayer has a thickness of from 0.125 mm to 3.0 mm.

5. The automotive glazing of claim 1, wherein the polymer interlayer comprises acoustic dampening.

6. The automotive glazing of claim 1, wherein a ratio of $t_o:t_i$ is in a range from 3 to 20.

7. A method of making the automotive glazing of claim 1, comprising:
    combining, in order, the outer ply, the polymer interlayer, and the inner ply in a stack; and
    applying heat and pressure to the stack to form the decorated laminate.

8. The method of claim 7 wherein at least one interior surface within the stack has the organic ink decoration disposed thereon prior to the combining into the stack.

9. A automotive glazing comprising:
    an outer ply comprising a non-chemically strengthened glass substrate having a thickness $t_o$;
    an inner ply comprising a strengthened glass substrate having a thickness $t_i$;
    an interlayer between the inner ply and the outer ply; and
    an organic ink decoration disposed and cured on the outer ply such that the organic ink decoration comprises a solid ink layer bonded to the outer ply and disposed between the outer ply and the interlayer, wherein $t_o$ is at least two times greater than $t_i$, wherein the organic ink decoration has a thickness of from 5 microns to 25 microns, wherein the decorated laminate has a simulated stone impact resistance as measured by a Weibull distribution of break velocities of from 40% to 95% when struck by a 1-gram ball bearing at a 45-degree angle of incidence at from 75 to 85 miles per hour, wherein the solid ink layer comprise an organic or inorganic pigment.

10. The automotive glazing of claim 9, wherein the outer ply is unstrengthened, annealed, or heat strengthened and has a surface compressive stress that is less than the inner ply.

11. The automotive glazing of claim 9, wherein the outer ply comprises soda lime glass, the interlayer comprises polyvinyl butyral, and the inner ply is chemically strengthened.

12. The automotive glazing of claim 9, wherein the interlayer has a thickness of from 0.125 mm to 3.0 mm.

13. The automotive glazing of claim 9, wherein the interlayer comprises acoustic dampening.

14. The automotive glazing of claim 9, wherein the interlayer comprises a polymer that is selected from the group consisting of polyvinyl butyral, ethylene vinyl acetate, polyvinyl chloride, ionomers, thermoplastic polyurethane, or combinations thereof.

15. The automotive glazing of claim 9, wherein a ratio of $t_o$:$t_i$ is in a range from 3 to 20.

16. The automotive glazing of claim 9, wherein the organic ink decoration is disposed and cured on both the outer ply and the inner ply adjacent the interlayer.

* * * * *